United States Patent
Shaffer et al.

(10) Patent No.: US 10,010,127 B1
(45) Date of Patent: Jul. 3, 2018

(54) PROTECTIVE HELMET WITH MULTI-DENSITY IMPACT LINERS AND METHOD FOR SAME

(71) Applicant: Bell Sports, Inc., Scotts Valley, CA (US)

(72) Inventors: Samuel J. Shaffer, Santa Cruz, CA (US); Benjamin W. Penner, Mt. Hermon, CA (US)

(73) Assignee: Bell Sports, Inc., Scotts Valley, CA (US)

( * ) Notice: Subject to any disclaimer, the term of this patent is extended or adjusted under 35 U.S.C. 154(b) by 0 days.

(21) Appl. No.: 15/638,217

(22) Filed: Jun. 29, 2017

(51) Int. Cl.
*A42B 3/12* (2006.01)
*A42C 2/00* (2006.01)
*B29C 44/12* (2006.01)
*B29L 31/48* (2006.01)

(52) U.S. Cl.
CPC .............. *A42B 3/125* (2013.01); *A42C 2/002* (2013.01); *B29C 44/12* (2013.01); *B29L 2031/4821* (2013.01)

(58) Field of Classification Search
CPC .. A42B 3/125; A42B 3/00; A42B 3/04; A42B 3/32; A42B 3/12; A42B 3/10; A42B 3/06; A42B 3/063; A42B 3/064; A42C 2/002; B29C 44/12; B29L 2031/4821
USPC .................................... 2/411, 412, 424, 425
See application file for complete search history.

(56) References Cited

U.S. PATENT DOCUMENTS

| | | | | |
|---|---|---|---|---|
| 2,688,747 A * | 9/1954 | Marx | ....................... | A42B 3/06 2/423 |
| 4,006,496 A * | 2/1977 | Marker | ................... | A42B 3/128 2/414 |
| 4,466,138 A * | 8/1984 | Gessalin | ................ | A42B 3/063 2/410 |
| 5,525,290 A * | 6/1996 | Carpenter | .............. | A42B 3/061 2/425 |
| 5,609,802 A * | 3/1997 | Jeng | ....................... | A42B 3/061 264/156 |
| 5,943,706 A * | 8/1999 | Miyajima | .............. | A42B 3/125 2/412 |
| 6,038,704 A * | 3/2000 | Crescentini | ............ | A42B 3/061 2/410 |
| 6,401,258 B1* | 6/2002 | Wilson | ..................... | A42B 1/02 2/410 |
| 6,446,270 B1* | 9/2002 | Durr | ....................... | A42B 3/061 2/412 |
| 6,904,615 B2* | 6/2005 | Kobe | ..................... | A63B 49/08 2/161.1 |

(Continued)

*Primary Examiner* — Shaun R Hurley
*Assistant Examiner* — Bao-Thieu L Nguyen
(74) *Attorney, Agent, or Firm* — Booth Udall Fuller, PLC

(57) ABSTRACT

A helmet and method for forming a helmet having a multi-density impact liner may include forming a puck with an interface surface and at least one side. The interface surface of the puck is placed in direct contact with a receiving surface of a cap located in an impact liner mold. Next, the interface surface of the puck is thermally fused directly to the receiving surface of the cap while contemporaneously an impact liner body is formed inside the mold. The impact liner body is fused to the at least one side of the puck, and to a majority of the receiving surface of the cap. The density of the puck may be greater than the density of the impact liner body. The puck and the impact liner body may be EPS, and the cap may be PC.

21 Claims, 6 Drawing Sheets

(56) References Cited

U.S. PATENT DOCUMENTS

| | | | | |
|---|---|---|---|---|
| 6,925,657 B2* | 8/2005 | Takahashi | ............... | A42B 3/128 2/412 |
| 6,969,478 B1* | 11/2005 | Hetzel, Jr. | ................ | A42B 3/06 264/137 |
| 8,020,219 B2* | 9/2011 | Jacobsen | ................ | A42B 3/066 2/421 |
| 8,117,679 B2* | 2/2012 | Pierce | .................... | A42B 3/125 2/410 |
| 8,683,617 B2* | 4/2014 | Chilson | .................. | A42B 3/283 2/171.1 |
| 8,782,818 B2* | 7/2014 | Ho | ......................... | A42B 3/003 2/411 |
| 2006/0162053 A1* | 7/2006 | Lee | ........................ | A42B 3/062 2/411 |
| 2008/0014453 A1* | 1/2008 | Levesque | .............. | B29C 51/085 428/475.5 |
| 2012/0036619 A1* | 2/2012 | Ytterborn | .............. | A42B 3/063 2/411 |
| 2012/0186002 A1* | 7/2012 | Bhatnagar | .............. | A42B 3/063 2/412 |
| 2014/0113086 A1* | 4/2014 | Greenhill | .................. | F41H 1/04 428/34.1 |
| 2014/0352036 A1* | 12/2014 | Cadens Ballarin | ..... | B29C 70/44 2/410 |
| 2015/0000012 A1* | 1/2015 | Ikeda | ..................... | A42B 3/10 2/411 |
| 2015/0157083 A1* | 6/2015 | Lowe | ..................... | A42B 3/064 2/412 |

\* cited by examiner

PROTECTIVE HELMET WITH MULTI-DENSITY IMPACT LINERS AND METHOD FOR SAME

TECHNICAL FIELD

Aspects of this document relate generally to helmets with multi-density impact liners.

BACKGROUND

Helmets are able to protect a wearer's head from impact through the deformation or even crushing of energy absorbing materials, such as foams. An important design consideration for helmets is the density of the energy absorbing material. A higher density material may absorb a harder impact but provide less cushioning, while lower density foam may provide a gentler cushion with the risk of "bottoming out" in a hard impact. Constructing an impact liner of a single density material may address one problem while creating another. Additionally, increasing the thickness of low-density materials to handle the harder impacts may increase the overall size of the helmet, potentially increasing the risk of rotational injuries.

Helmets may sometimes employ energy management materials of different densities to meet various needs, such as impact rating, as well as the overall size, shape, and weight of the helmet. Multi-density impact liners have previously been formed by incorporating preformed portions of material having one density, called pucks, into the body of an impact liner having a second density. However, conventional use of pucks requires them to "float" in the impact liner body, limiting the degree to which a high-density puck can reduce the thickness of a helmet. Additionally, floating pucks may reduce the overall structural soundness of a helmet, particularly where they interface with the foam of a different density.

SUMMARY

According to one aspect, a method for forming a helmet includes forming a puck having an interface surface and at least one side, and placing the interface surface of the puck in direct contact with a receiving surface of a cap located in an impact liner mold. The method also includes thermally fusing the interface surface of the puck directly to the receiving surface of the cap while contemporaneously forming an impact liner body inside the mold. The impact liner body fuses to the at least one side of the puck and to a majority of the receiving surface of the cap while being formed.

Particular embodiments may comprise one or more of the following features. The density of the puck may be greater than the density of the impact liner body. The puck and/or the impact liner body may include EPS, and the cap may include PC. The density of the puck may be greater than the density of the impact liner body. Furthermore, proximate the at least one side fused to the impact liner body, the puck may have a thickness substantially equal to a thickness of the impact liner body. The interface surface of the puck may be in contiguous contact with the receiving surface of the cap. The puck may be located proximate a front edge of the cap. At least one of the at least one sides of the puck may be exposed adjacent to an edge of the cap after the impact liner body is formed. The receiving surface of the cap may be an outer surface of a multi-liner rotation cap. The outer surface may face away from an interior of the helmet. The receiving surface of the cap may be an inner surface of an external helmet cap. The inner surface may face toward an interior of the helmet.

According to another aspect of the disclosure, a method for forming a helmet includes forming a puck comprising EPS having an interface surface and at least one side and placing the interface surface of the puck in direct contact with a receiving surface of a cap located in an impact liner mold such that the puck is located proximate a front edge of the cap. The cap includes PC. The method also includes thermally fusing the interface surface of the puck directly to the receiving surface of the cap while contemporaneously forming an impact liner body inside the mold. The impact liner body fuses to the at least one side of the puck and to a majority of the receiving surface of the cap while being formed.

According to yet another aspect of the disclosure, a helmet includes a cap having a receiving surface, an impact liner body thermally fused to a majority of the receiving surface of the cap, and a puck having an interface surface and at least one side. The interface surface of the puck is thermally fused to the receiving surface of the cap, and at least one of the at least one sides of the puck is thermally fused to the impact liner body.

Particular embodiments may comprise one or more of the following features. The interface surface of the puck may be in contiguous contact with the receiving surface of the cap. The puck may have a density higher than a density of the impact liner body. The puck and/or the impact liner body may comprise EPS, and/or the cap may comprise PC. The puck may be located proximate a front edge of the cap. At least one of the at least one sides of the puck may be exposed. Finally, proximate the at least one side directly coupled to the impact liner body, the puck may have a thickness substantially equal to a thickness of the impact liner body.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶ 6. Thus, the use of the words "function," "means" or "step" in the Detailed Description or Description of the Drawings or claims is not intended to somehow indicate a desire to invoke the special provisions of 35 U.S.C. § 112, ¶ 6, to define the invention. To the contrary, if the provisions of 35 U.S.C. § 112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶ 6. Moreover, even if the provisions of 35 U.S.C. § 112, ¶ 6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
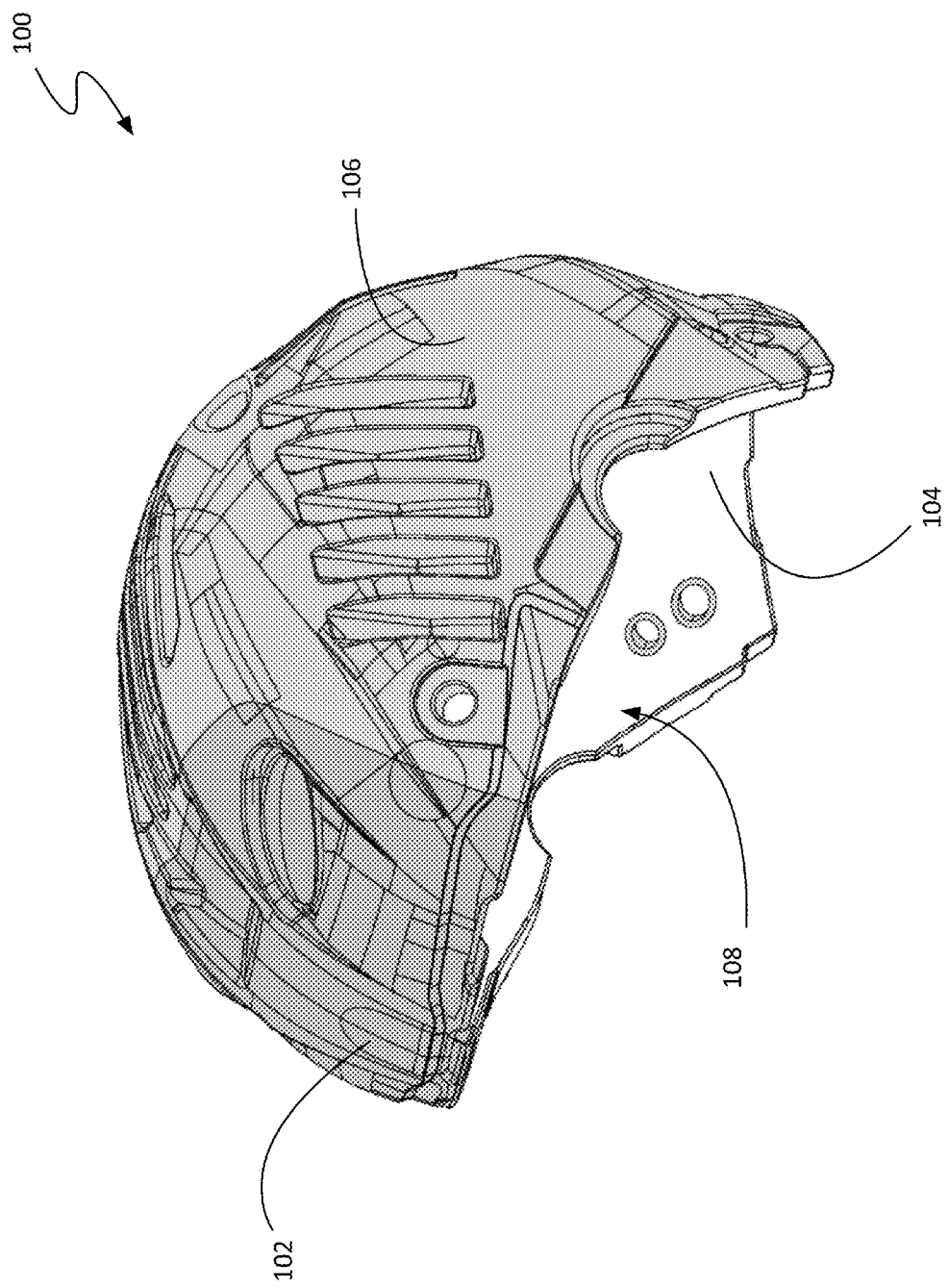
FIG. 1 is a perspective view of a multi-density impact liner.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Protective helmets make use of energy absorbing materials, such as EPS foam, to attenuate the forces experienced by a wearer due to an impact. An important design consideration for helmets is the density of the energy absorbing material using in one or more impact liners. A higher density material may be able to prevent severe injury due to a high intensity impact, but may also lack the cushioning to avoid discomfort or even minor injuries. On the other hand, a low-density material may provide a gentle cushion for the wearer's head, but may also "bottom out" on a hard impact, potentially failing to attenuate enough impact energy to avoid injury. Increasing the thickness of the lower density material to compensate for the reduced capacity to absorb impacts presents an additional problem: bulk. In addition to being less appealing to consumers, large helmets may also increase the risk of rotational injuries due to the increased torque provided by the enlarged helmet radius.

Helmets sometimes employ impact liners using multiple energy management materials of different densities. A multi-density impact liner may allow for the increased protection of high density foam in areas that are more vulnerable, or areas that need to be thin to accomplish a design or performance goal, and the increased comfort of lower density foam elsewhere. Multi-density impact liners have previously been formed by incorporating pre-formed portions of material called pucks into the body of an impact liner; the densities of the puck(s) and impact liner body may be chosen to satisfy the needs of both design and function.

However, conventional use of pucks has required them to "float" within the impact liner body, limiting the degree to which a high-density puck can reduce the thickness of a helmet. For example, a high-density puck would always have at least some low-density material surrounding it. Additionally, floating pucks may reduce the overall structural soundness of an impact liner, particularly where the puck interfaces with foam of a different density.

Contemplated as part of this disclosure are helmets having multi-density impact liners comprising a cap-fused, full thickness puck, and the methods used to form the liners. Specifically, the impact liners contemplated herein comprise one or more pucks that are thermally fused to a surface of a cap as well as fused with the impact liner body. Advantageous over conventional multi-density impact liners, the pucks of the impact liners disclosed herein are not required to float inside the impact liner body, but rather may extend the full thickness of the liner. This allows for utilization of pucks of different density than the impact liner body with greater efficiency. The lack of "float" makes it possible to create thinner and lighter helmets with equal efficacy. Furthermore, by fusing the puck to a cap, the cap is a more integrated part of the impact liner and adds to the structural soundness.

Figure 2:
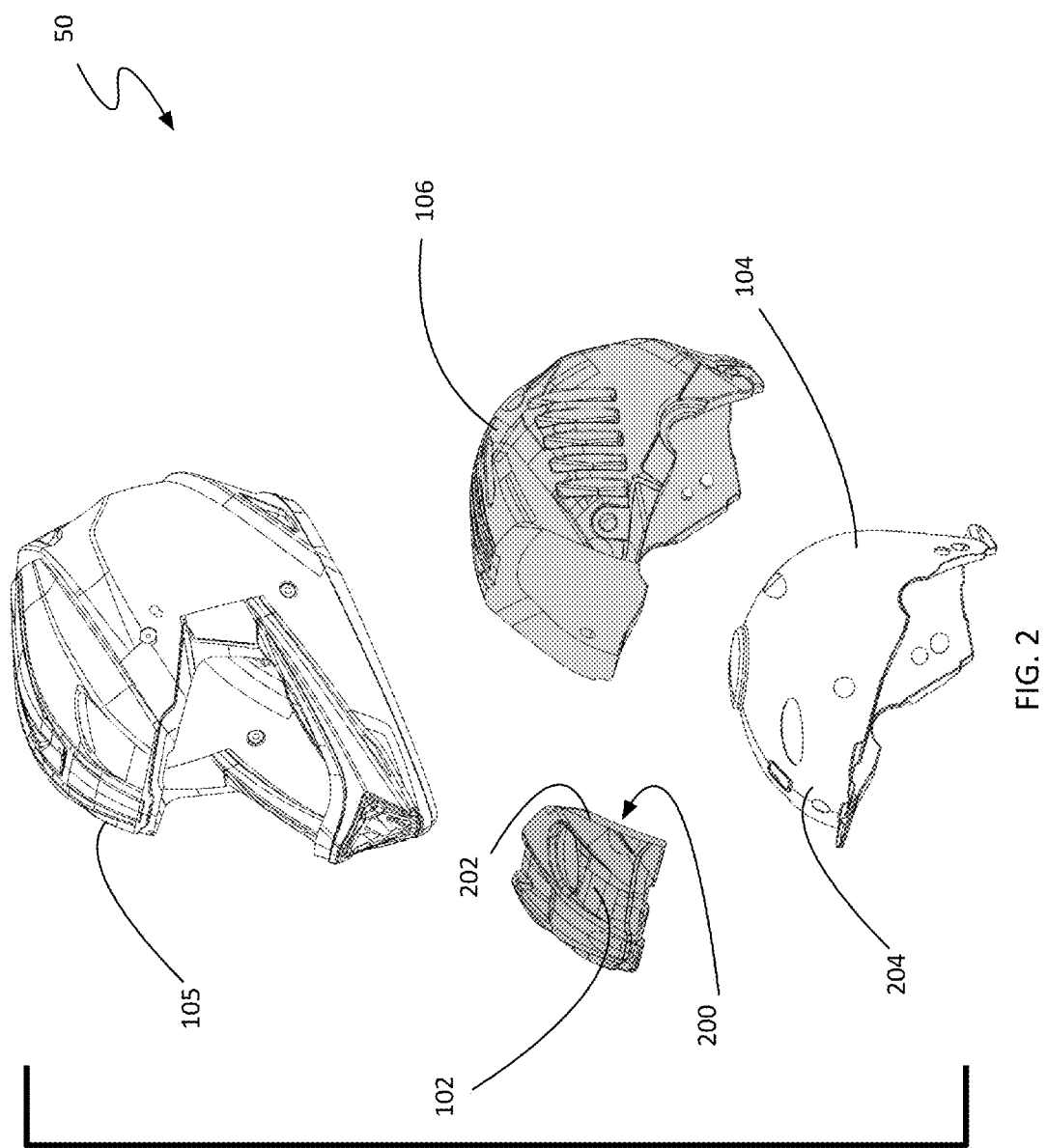
FIG. 2 is an exploded perspective view of a helmet with a multi-density impact liner.

FIG. 1 illustrates a perspective view of a non-limiting example of a multi-density impact liner 100 comprising a puck 102 fused with an impact liner body 106. Both the puck 102 and the impact liner body 106 are fused to a surface of a cap 104. FIG. 2 illustrates an exploded view of a non-limiting example of a helmet 50 comprising the multi-density impact liner 100 of FIG. 1 covered by a helmet shell 105. Only a single impact liner is shown in FIGS. 1 and 2, for clarity. However, it should be clear to one skilled in the art that a helmet may comprise a multi-density impact liner 100 in addition to one or more other impact liners, be they of single or multiple density. As will be discussed in greater detail with respect to FIG. 5, the non-limiting example of an impact liner 100 depicted in FIGS. 1 through 4 is configured to facilitate rotation with respect to another impact liner, to absorb rotational energy caused by an impact.

Although not shown in FIG. 2, the helmets of this disclosure may comprise any other features of protective helmets previously known in the art, such as but not limited to straps, comfort liners, masks, visors, and the like. For example, in one embodiment, an innermost impact liner may include a fit system in the interior 108 of the helmet to provide improved comfort and fit.

In the context of the present description and the claims that follow, a puck is a piece of energy absorbing material formed to have a specific shape and designed to be incorporated into an impact liner. While this disclosure is focused on the use of a puck 102 to achieve multiple densities within a single impact liner, in other embodiments, a puck 102 may be designed with other purposes in mind. For example, in one embodiment, it may be desirable to incorporate an electronic device (e.g. accelerometers, sensors, radio beacons, etc.) within an impact liner, but the device cannot withstand the temperatures associated with direct in-molding. By encasing the device in a preformed puck, the device may be fused with the impact liner while the puck 102 insulates the device from the heat.

According to various embodiments, the puck 102 may be composed of an energy management material different from, or at least having a different density from, the energy management material of the impact liner body 106. In some embodiments, the puck 102 may be of a higher density than the impact liner body 106, to bolster protection from high energy impacts without increasing thickness, while in other embodiments the puck 102 may be of a lower density.

Reference is made herein to pucks 102 comprising an energy management material. As used herein, the energy management material may comprise any energy management material known in the art of protective helmets, such as but not limited to expanded polystyrene (EPS), expanded polyurethane (EPU), expanded polyolefin (EPO), expanded polypropylene (EPP), or other suitable material. Furthermore, the impact liner body 106 may comprise any of these energy management materials, or others known in the art, that are compatible with the in-molding process to be discussed in greater detail with respect to FIG. 4.

According to some embodiments, the cap 104 may serve as a layer separating one impact liner from another, while in other embodiments the cap may serve as a shell, protecting the exterior of the helmet from puncture, damage and wear, and may help spread the force of an impact over a greater area. In some embodiments the cap may cover an area roughly the same size as the one or more neighboring impact liners. In other embodiments, the cap 104 may be reduced in size.

The cap 104 may provide additional strength and stability to the impact liner 100, and may help further incorporate the puck 102 into the liner 100. According to various embodiments, the cap 104 may comprise any helmet shell material known in the art, including but not limited to a layer of stamped polyethylene terephthalate (PET) or a polycarbonate (PC) shell.

As shown in FIG. 2, the puck 102 comprises an interface surface 200 on at least one side 202 of the puck 102. The interface surface 200 of the puck 102 is the surface intended to thermally fuse with a receiving surface 204 of the cap 104. As will be discussed in greater detail with respect to FIGS. 5 and 6, the receiving surface 204 may reside on one side of the cap 104 in some embodiments, and may reside on the other side of the cap 104 in other embodiments.

Figure 3:
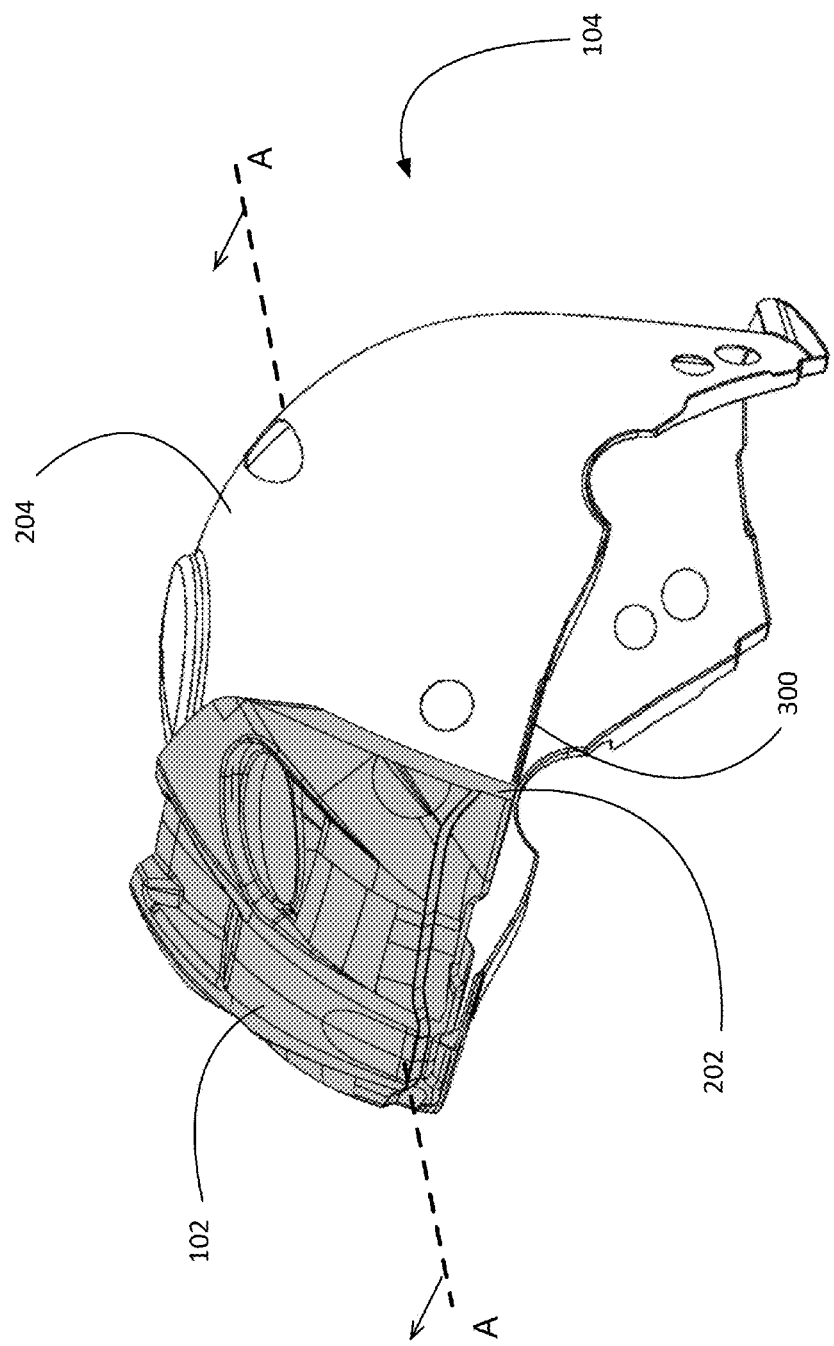
FIG. 3 is a perspective view of a puck and a cap.

According to various embodiments, a method for forming a multi-density impact liner may begin with the formation of one or more pucks 102. FIG. 3 depicts a non-limiting example of a puck 102 located on the receiving surface 204 of a cap 104. As mentioned earlier, the puck 102 is formed before the formation of the impact liner body 106. The puck 102 may be created using any of the methods known in the art of protective helmets, including but not limited to injection molding. In some embodiments, the puck 102 may be small with respect to the rest of the impact liner, while in other embodiments the puck 102 may make up a quarter, or even more of the impact liner 100.

Pucks 102 may be various sizes, as well as shapes, according to various embodiments. Additionally, a puck 102 may have a smooth interface surface 200, to facilitate the thermal fusing with the receiving surface 204 of the cap 104. In some embodiments, the interface surface 200 of the puck 102 may be in contiguous contact with the receiving surface 204 of the cap 104. In the context of the present description and the claims that follow, contiguous contact means that the two surfaces are completely fused to each other everywhere they overlap, with no gaps or bubbles. Such fusing may be difficult with prior methods of employing a puck; however, formation of the impact liner 100 while the puck 102 is in direct contact with the cap 104 may facilitate such a degree of fusing. In particular embodiments, the two surfaces are fused to each other over a majority of the regions where they overlap, with no gaps or bubbles.

The rest of the puck 102, on the other hand, may have a more complicated shape. Increased surface area on the sides 202 of the puck 102 may facilitate fusing with the impact liner body when it is formed. Furthermore, in some embodiments, the puck 102 may have features on the surface opposite the interface surface 200 that may mate with features of an impact liner mold (see mold 400 of FIG. 4). For example, the mold may have a protrusion that mates with a void on the puck 102. This may be advantageous, in that it may help stabilize the puck 102 in the desired position during the formation of the impact liner body 106.

The non-limiting example shown in FIG. 3 depicts the puck 102 located at an edge 300 of the cap 104. In embodiments where the impact liner body 106 is formed through in-molding, it may be advantageous (though not required) to position the puck 102 near an edge 300 of the cap 104, to facilitate the spreading and expanding of the energy management material of the impact liner body 106. In some embodiments, the puck 102 may be positioned such that at least one of its sides 202 is exposed adjacent an edge 300 of the cap 104 after the impact liner body 106 has been formed.

In other embodiments, the puck 102 may be located anywhere on the receiving surface 204 of the cap 104.

Figure 4:
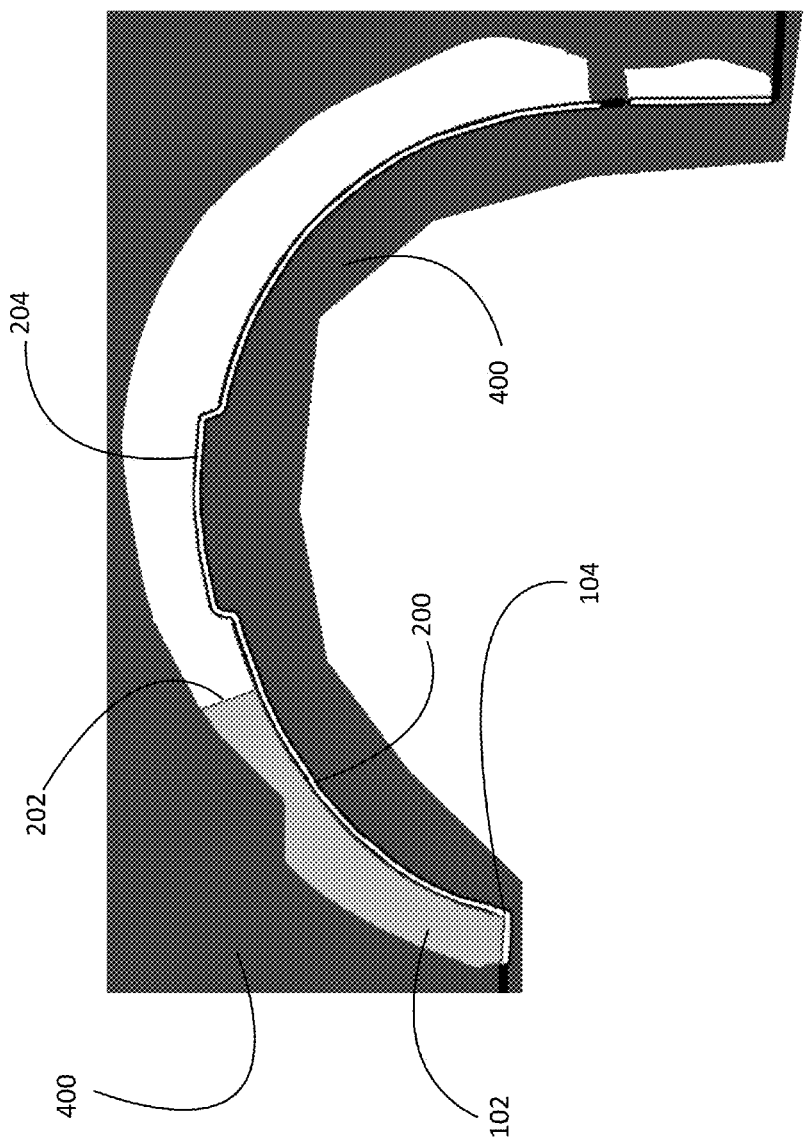
FIG. 4 is a cross sectional view of the puck and cap of FIG. 3 inside an impact liner mold taken along line A-A of FIG. 3.

FIG. 4 depicts a cross sectional view of the puck 102 and the cap 104 of FIG. 3 along the line A-A, inside of an impact liner mold 400, according to various embodiments. Once the puck 102 has been formed, it may be positioned and placed in direct contact with the receiving surface 204 of the cap 104. This may be done before or after the cap 104 is placed inside an impact liner mold 400.

The impact liner body 106 may be formed inside the impact liner mold 400, around the puck 102, by filling the mold 400 with energy management material (e.g. EPS beads, pre-expanded beads, etc.) and applying heat (e.g. steam, etc.). The heat applied to the impact liner mold 400 to expand the material of the impact liner body 106 contemporaneously fuses the interface surface 200 of the puck to the receiving surface 204 of the cap 104. At the same time, the expanding material that will become the impact liner body 106 fuses with at least one side 202 of the puck 102 while simultaneously fusing with at least a part of the receiving surface 204 of the cap 104, further incorporating the puck 102 into the resulting impact liner 100. In some embodiments, the impact liner body 106 is thermally fused to a majority of the receiving surface 204 of the cap 104 during its formation.

Figure 5:
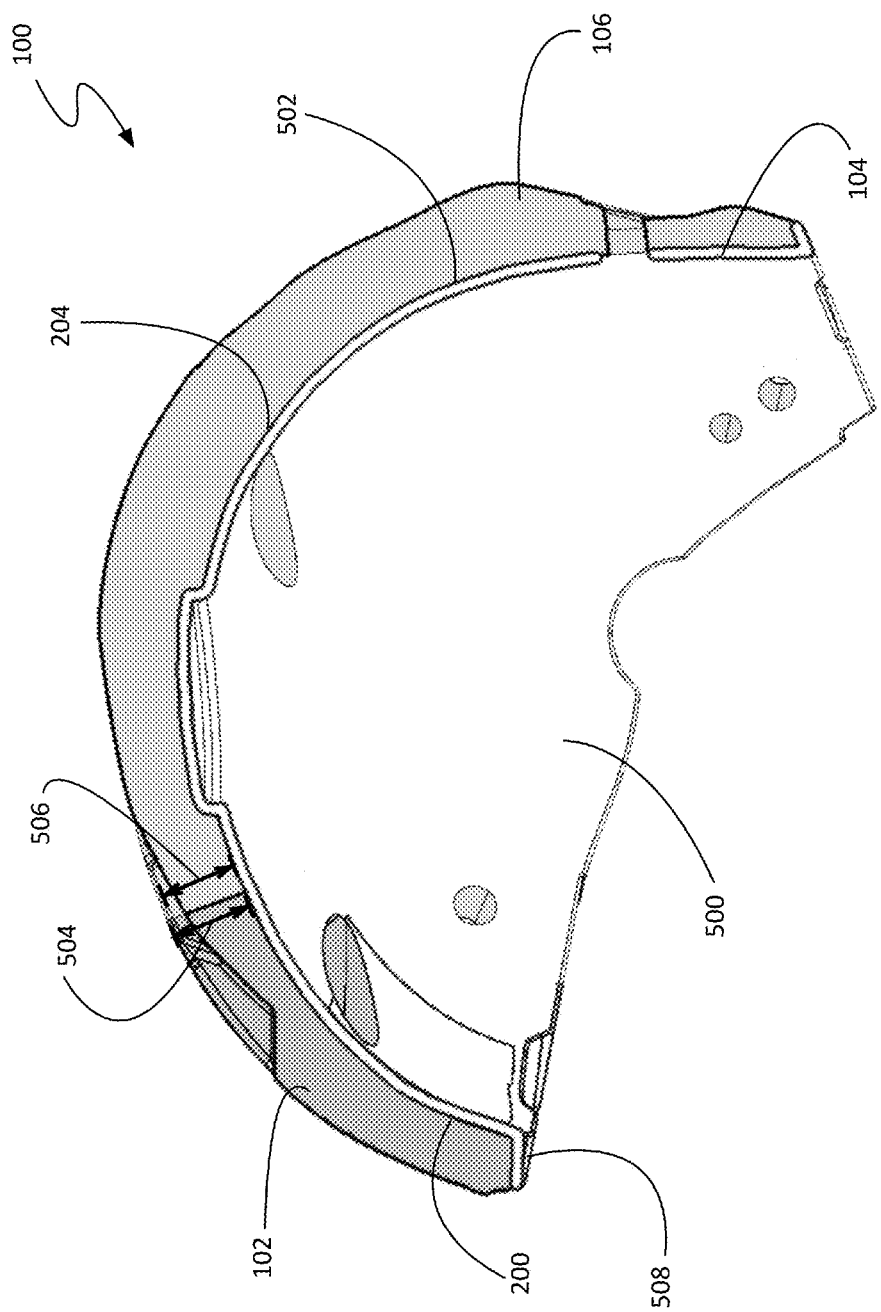
FIG. 5 is a cross sectional view, similar to that of FIG. 4, of a multi-density impact liner having a multi-liner rotation cap after formation inside an impact liner mold.

As previously mentioned, in some embodiments, the cap 104 serves as an interface between two impact liners. FIG. 5 depicts a cross-sectional view of a multi-density impact liner 100 along the line A-A configured to serve such a purpose. The cap 104 is a multi-liner rotation cap 500, which is configured to facilitate the rotation of the liner 100 to which it is fused with respect to another impact liner. As shown, the receiving surface 204 is the outer surface 502 of the multi-liner rotation cap 100, meaning it is the surface facing away from the interior 108 of a helmet 50 containing the liner 100. In other words, the puck 102 was placed on the outside of the curved surface of the cap 104 before the impact layer body 106 was formed.

Figure 6:
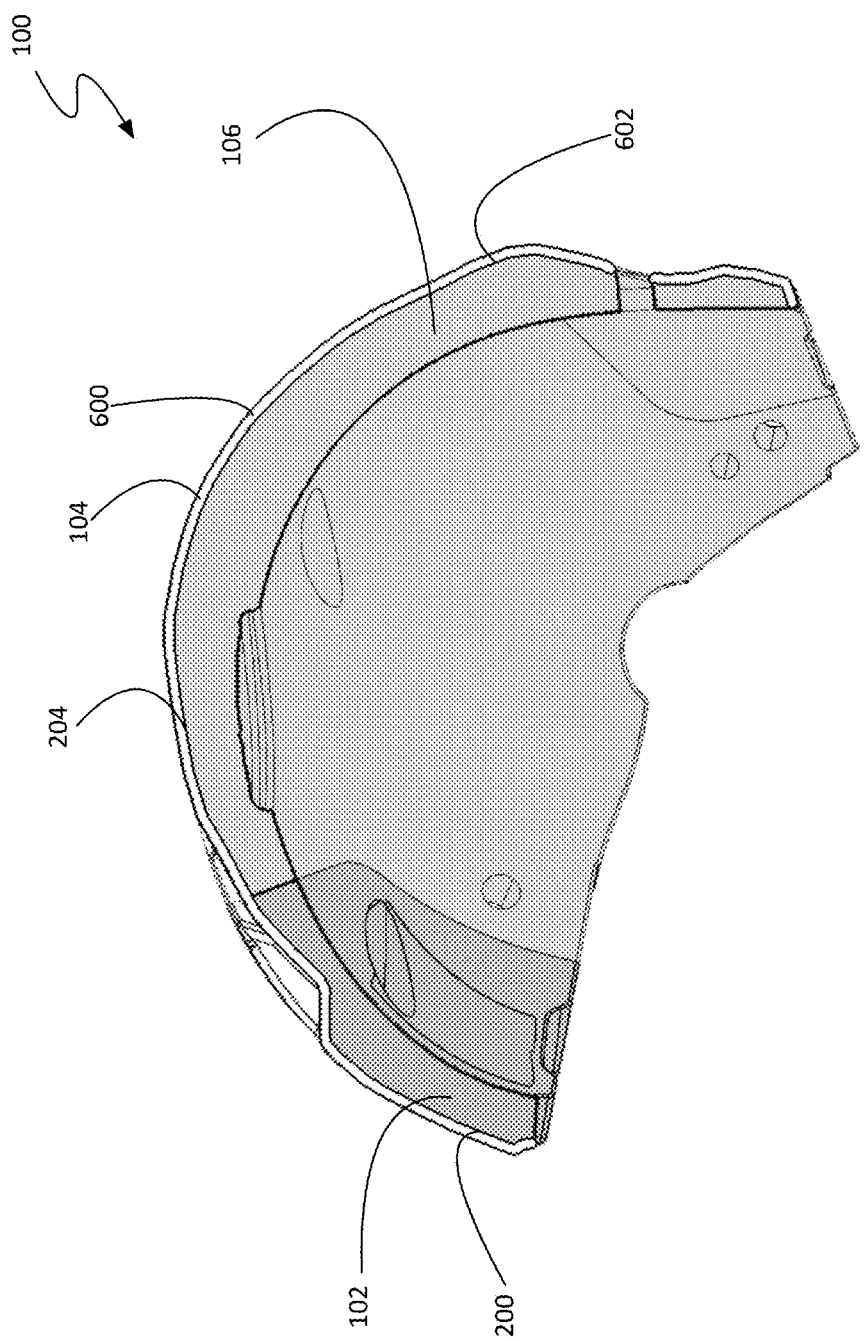
FIG. 6 is a cross sectional view, similar to that of FIG. 5, of a multi-density impact liner having an external helmet cap.

In some embodiments, the cap 104 serves as a protective shell on the outside of a helmet 50. FIG. 6 depicts a cross-sectional view of a multi-density impact liner 100 along the line A-A configured to be the outermost liner of a helmet 50. The cap 104 is an external helmet cap 600, which is configured to protect against punctures, abrasions, and serves to spread the force of an impact over a wider area. As shown, the receiving surface 204 is the inner surface 602 of the external helmet cap 600, meaning it is the surface facing toward the interior 108 of a helmet 50 containing the liner 100. The puck 102 was placed on the inside of the curved surface of the cap 104 before the impact liner body 106 was formed.

As shown in FIGS. 5 and 6, the puck 102 extends the full thickness of the impact liner 100, advantageous over previous floating pucks. In some embodiments, the puck 102 may smoothly transition into the impact liner body 106. Specifically, in some embodiments, the thickness 504 of the puck 102 proximate the puck side 202 fused to the impact liner body 106 is substantially equal to the thickness 506 of the impact liner body 106 proximate the same puck side 202. In the context of the present description and the claims that follow, substantially equal means that the two thicknesses are within 10% of each other, according to various embodiments.

It is also worth noting in FIGS. 5 and 6 that the puck 102 is located at the front edge 508 of the cap 104 to which it is fused. As the front part of a wearer's head is at greatest risk for high energy impact (e.g. forward momentum can carry people head first into an impact), it may be advantageous to employ a puck 102 of higher density energy management material at the front of the impact liner 100. In other embodiments, puck 102 may be located anywhere in the impact liner 100.

Where the above examples, embodiments and implementations reference examples, it should be understood by those of ordinary skill in the art that other helmets, impact liners, and manufacturing methods and examples could be intermixed or substituted with those provided. In places where the description above refers to particular embodiments of helmets, pucks, caps, and liners, as well as customization methods, it should be readily apparent that a number of modifications may be made without departing from the spirit thereof and that these embodiments and implementations may be applied to other helmet customization and manufacturing technologies as well. Accordingly, the disclosed subject matter is intended to embrace all such alterations, modifications and variations that fall within the spirit and scope of the disclosure and the knowledge of one of ordinary skill in the art.

What is claimed is:

1. A method for forming a helmet, the method comprising:
forming a puck having an interface surface and at least one side;
placing the interface surface of the puck in direct contact with a receiving surface of a cap located in an impact liner mold;
thermally fusing the interface surface of the puck directly to the receiving surface of the cap while contemporaneously forming an impact liner body inside the impact liner mold, the impact liner body fusing to the at least one side of the puck and to a majority of the receiving surface of the cap while being formed.

2. The method of claim 1, wherein the density of the puck is greater than the density of the impact liner body.

3. The method of claim 1, wherein the puck and the impact liner body comprise expanded polystyrene (EPS), and the cap comprises polycarbonate (PC).

4. The method of claim 3, wherein the density of the puck is greater than the density of the impact liner body, and wherein, proximate the at least one side fused to the impact liner body, the puck has a thickness substantially equal to a thickness of the impact liner body.

5. The method of claim 1 wherein the interface surface of the puck is in contiguous contact with the receiving surface of the cap.

6. The method of claim 1, wherein the puck is located proximate a front edge of the cap.

7. The method of claim 1, wherein at least one of the at least one sides of the puck is exposed adjacent to an edge of the cap after the impact liner body is formed.

8. The method of claim 1, wherein the receiving surface of the cap is an outer surface of a multi-liner rotation cap, the outer surface facing away from an interior of the helmet.

9. The method of claim 1, wherein the receiving surface of the cap is an inner surface of an external helmet cap, the inner surface facing toward an interior of the helmet.

10. A method for forming a helmet, the method comprising:
forming a puck comprising expanded polystyrene (EPS) having an interface surface and at least one side;
placing the interface surface of the puck in direct contact with a receiving surface of a cap located in an impact liner mold such that the puck is located proximate a front edge of the cap, the cap comprising polycarbonate (PC);

thermally fusing the interface surface of the puck directly to the receiving surface of the cap while contemporaneously forming an impact liner body inside the impact liner mold, the impact liner body fusing to the at least one side of the puck and to a majority of the receiving surface of the cap while being formed.

11. The method of claim 10, wherein the receiving surface of the cap is an outer surface of a multi-liner rotation cap, the outer surface facing away from an interior of the helmet.

12. The method of claim 10, wherein the receiving surface of the cap is an inner surface of an external helmet cap, the inner surface facing toward an interior of the helmet.

13. A helmet, comprising:
a cap having a receiving surface;
an impact liner body thermally fused to a majority of the receiving surface of the cap; and
a puck having an interface surface and at least one side, wherein the interface surface of the puck is thermally fused to the receiving surface of the cap, and at least one of the at least one sides of the puck is thermally fused to the impact liner body.

14. The helmet of claim 13, wherein the interface surface of the puck is in contiguous contact with the receiving surface of the cap.

15. The helmet of claim 13, wherein the puck has a density higher than a density of the impact liner body.

16. The helmet of claim 13, wherein the puck and the impact liner body comprise expanded polystyrene (EPS), and the cap comprises polycarbonate (PC).

17. The helmet of claim 13, wherein the puck is located proximate a front edge of the cap.

18. The helmet of claim 13, wherein at least one of the at least one sides of the puck is exposed.

19. The helmet of claim 13, wherein the receiving surface of the cap is an outer surface of a multi-liner rotation cap, the outer surface facing away from an interior of the helmet.

20. The helmet of claim 13, wherein the receiving surface of the cap is an inner surface of an external helmet cap, the inner surface facing toward an interior of the helmet.

21. The helmet of claim 13, wherein, proximate the at least one side directly coupled to the impact liner body, the puck has a thickness substantially equal to a thickness of the impact liner body.

* * * * *